(12) United States Patent
Liu et al.

(10) Patent No.: US 6,582,549 B2
(45) Date of Patent: Jun. 24, 2003

(54) METHOD OF MANUFACTURING A POINTING STICK

(75) Inventors: Jia Hung Liu, Hsinchuang (TW); Pin-Chien Liao, Taoyuan Hsien (TW)

(73) Assignee: Darfon Electronics Corp., Taoyuan (TW)

( * ) Notice: Subject to any disclaimer, the term of this patent is extended or adjusted under 35 U.S.C. 154(b) by 110 days.

(21) Appl. No.: 09/741,448

(22) Filed: Dec. 19, 2000

(65) Prior Publication Data

US 2001/0017187 A1 Aug. 30, 2001

(30) Foreign Application Priority Data

Feb. 21, 2000 (TW) .................................. 89102943 A (51) Int. Cl.$^7$ ............................................. B29C 65/00
(52) U.S. Cl. .................... 156/304.2; 156/292; 156/305; 345/161
(58) Field of Search ........................... 156/292, 295, 156/304.2, 305; 345/161

(56) References Cited

U.S. PATENT DOCUMENTS

| | | | | |
|---|---|---|---|---|
| 5,754,167 A | * | 5/1998 | Narusawa et al. | 345/161 |
| 5,894,301 A | * | 4/1999 | Seffernick | 345/160 |
| 6,115,030 A | * | 9/2000 | Berstis et al. | 345/161 |
| 6,356,257 B1 | * | 3/2002 | Kaneo | 345/161 |

* cited by examiner

*Primary Examiner*—Michael W. Ball
*Assistant Examiner*—Todd J. Kilkenny
(74) *Attorney, Agent, or Firm*—Ladas & Parry (57) ABSTRACT

A method of manufacturing a pointing stick is provided. A post or a substrate of the present invention is provided with a hollow portion, and a predetermined gap is defined between the post and the substrate. After an adhesive is supplied to the gap through the hollow portion, it is heated to join the post and the substrate.

4 Claims, 10 Drawing Sheets

METHOD OF MANUFACTURING A POINTING STICK

BACKGROUND OF THE INVENTION

1. Field of the Invention

The present invention relates to a method of manufacturing a pointing stick; in particular, the invention relates to a method capable of manufacturing a pointing stick with strain gages that are not affected by adhesives.

2. Description of the Related Art

In general, the input and output data processing of a computer are carried out interactively with a user via a data input/output device. For example, the data input device may be a keyboard or a pointing device, while the data output device may be a display screen of a computer that displays such data as characters and graphics. Examples of pointing devices include a pointing stick, a digitizer, a mouse, and a track ball.

In recent years, it has become even more popular to use the pointing device, in addition to the keyboard, as the data input device to apply in fields such as data processing. The reason for the popular use of the pointing device can be attributed to the newfound convenience brought by operating systems and application software that employs a free-to-move pointer in response to interactive operations by a user for which the use of the pointing device is essential. For example, Windows operations and icon operations are examples of the interactive operations.

On the other hand, the computer today is no longer limited to the bulky desktop type having an independent computer body, keyboard, and display monitor. Recently, portable computers such as the laptop type, notebook type and palm-top type have become popular, and such portable computers have an integrated computer body, keyboard, and display. The portable computer such as the laptop type can be conveniently carried because it is light and compact.

However, because of the increasing popularity of using such portable computers as the laptop type, the operating conditions under which the pointing device is incorporated into a computer has become more diversified. In other words, the pointing device of a desktop type computer is typically operated on the top of a desk while the pointing device for the portable computer is more compact-sized and operable away from the desk.

For this reason, it is desirable that the pointing device used with the portable computer does not require a setup area such that the pointing device is integrated with the portable computer. In addition, there is also a demand to reduce the setup area of the pointing device of the desktop computer, where it is more desirable to assemble the pointing device within the computer in order to meet such a demand.

In general, the pointing stick is divided into two groups: a pillared-type and a planar-type. Because the present invention is mainly aimed at the planar-type, the following description is simply about the structure, the assembling manner and the operating theorem of the planar-type pointing stick.

Figure 1:
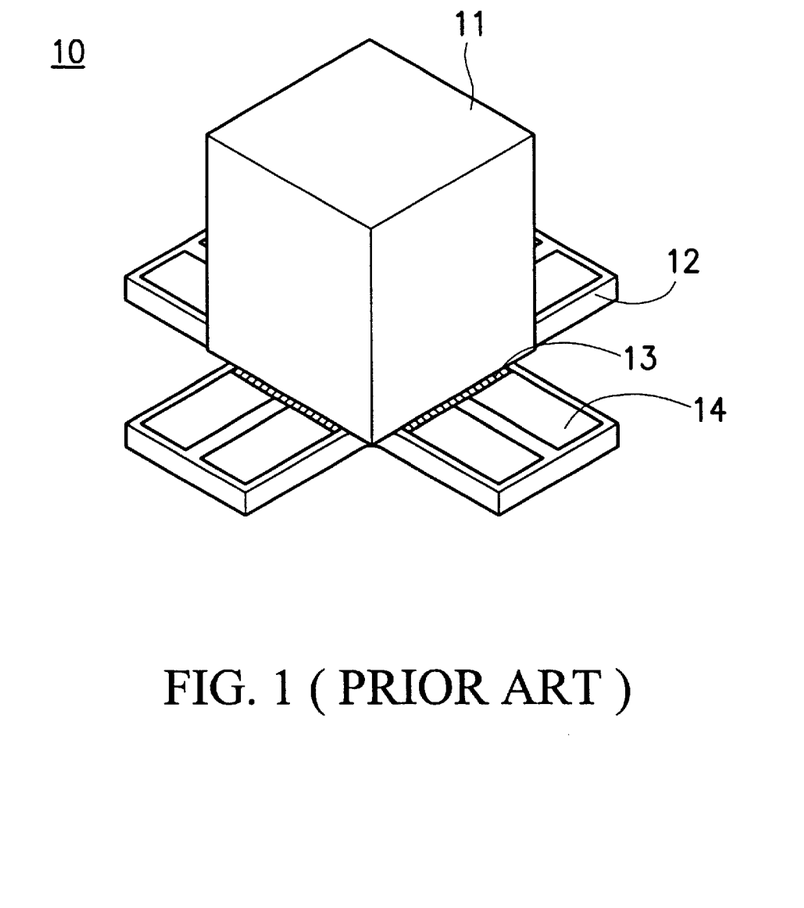
FIG. 1 is a perspective view showing an example of a conventional pointing stick.

Refer to FIG. 1. FIG. 1 is a perspective view showing an example of a conventional pointing stick. In FIG. 1, a pointing stick 10 comprises a resilient substrate 12, a post 11, a plurality of strain gages 13 and a plurality of electrodes 14.

When an operator places his or her finger tip on the tip end of the post 11 and displaces the tip end in an arbitrary direction, a strain dependent on the strain of the substrate 12 generated by the force applied on the tip end of the post 11 is generated at each strain gage 13. Since the resistance of the strain gage 13 is in proportion to the degree of the strain engaged thereupon, it is possible to determine the moving direction and moving distance of the cursor or pointer on the display screen, based on the changes in the resistance of each of the strain gages 13, by detecting the change in the resistance of each strain gage 13.

Figure 2:
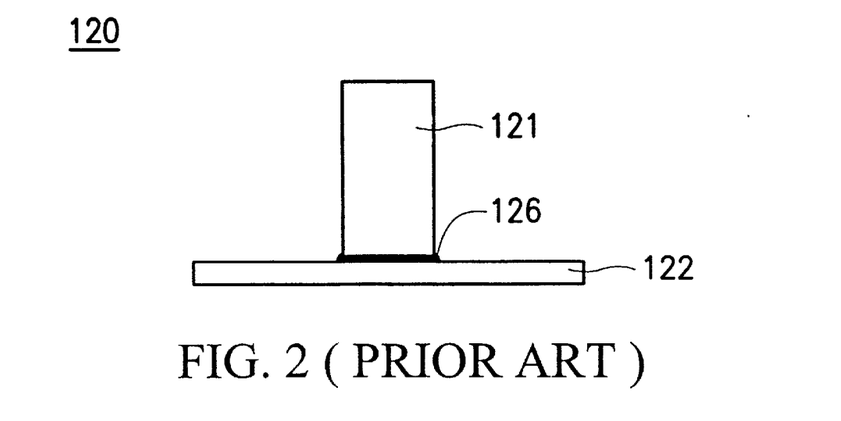
FIG. 2 is a schematic view depicting a conventional method of manufacturing a pointing stick.

In the conventional method of manufacturing a pointing stick, the assembling manner between the post and the substrate is shown in FIG. 2. After adhesives 126 are added on a post 121 or a substrate 122, the post 121 is disposed on a predetermined position of the substrate 122. Then, the post 121 and the substrate 122 are combined to form a pointing stick 120.

The conventional method of manufacturing a pointing stick can still be applied to the pillared-type pointing stick and the planar-type pointing stick because their strain gages are disposed on the post or on the position, far away from the post, of the substrate. However, after the overall size of the pointing stick decreases continuously, the distance between the strain gages, on the post or the substrate, and the boundary between the post and the substrate decreases correspondingly. As a result, the excessive adhesive is easily stained with the strain gages, and the sensitivities of the pointing stick are constrained. Moreover, because the strain gages of the pointing stick as shown in FIG. 1 are disposed on the substrate in a partly overlapped manner, the adhesive will be stained with the strain gages, non-contact with the post, when the adhesive are added in a manner as shown in FIG. 2. Then, the hardened adhesive may influence the operation and the sensitivities of the strain gages.

SUMMARY OF THE INVENTION

In view of the disadvantages of the aforementioned conventional method of manufacturing a pointing stick, the present invention provides a method of manufacturing a pointing stick comprising: (a) providing a substrate; (b) providing a post; (c) disposing the post on a predetermined position of the substrate in a manner to form a gap between the substrate and the post; (d) supplying a predetermined amount of adhesives into the gap; and (e) heating the adhesives to combine the post and the substrate.

Accordingly, the present method further comprises: forming a hollow portion and a plurality of protrusions on the substrate in step (a); disposing the post on the substrate in a manner that the post is abutted against the protrusions in step (c); and supplying the adhesives through the hollow portion in step (d)

Furthermore, the present invention provides a method of manufacturing a pointing stick comprising: (a) providing a substrate and a post; (b) disposing the post on the substrate; (c) providing an auxiliary plate; (d) disposing the auxiliary plate on a predetermined position of the substrate in a manner to form a gap between the substrate and the auxiliary plate; (e) supplying a predetermined amount of adhesives to the gap; and (f) heating the adhesives to combine the auxiliary plate and the substrate.

BRIEF DESCRIPTION OF THE DRAWINGS

The invention is hereinafter described in detail by reference to the accompanying drawings in which.

DETAILED DESCRIPTION OF THE INVENTION

First Embodiment

Figure 3A:
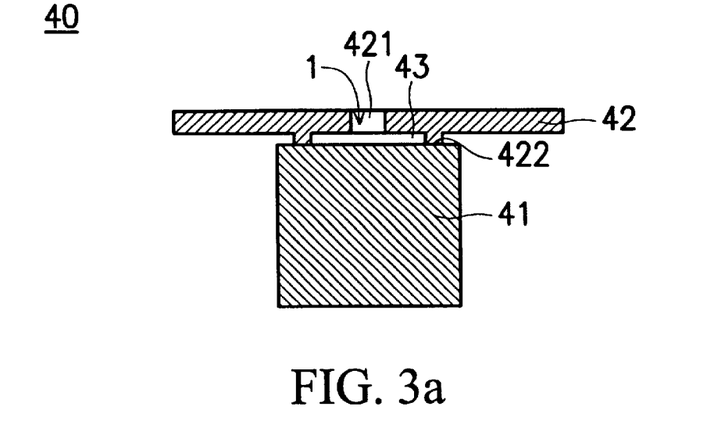
FIG. 3a is a schematic view depicting a method of manufacturing a pointing stick of a first embodiment of the present invention.
Figure 3B:
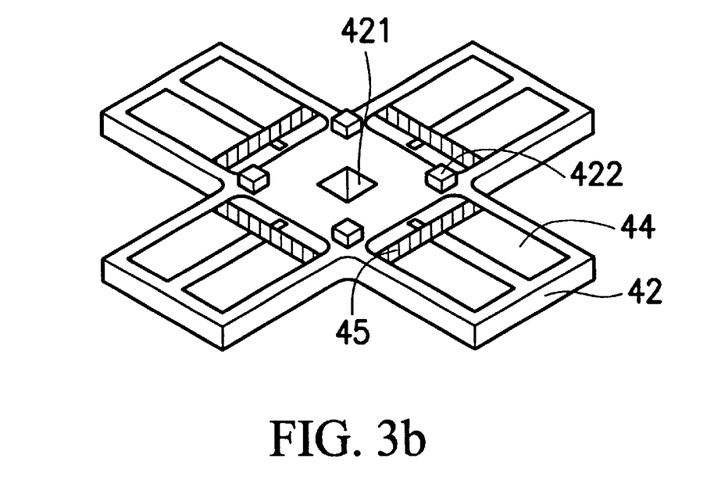
FIG. 3b shows a schematic view of a substrate according to the first embodiment of the present invention.

The structure of a pointing stick of a first embodiment of the present invention is shown in FIG. 3a and FIG. 3b. The pointing stick 40 comprises a post 41, a substrate 42, plural strain gages 45 and plural electrodes 44. The substrate 42 is provided with a hollow portion 421 and plural protrusions 422. In FIG. 3b, the number of the protrusions 422 is four. By means of the protrusions 422, a gap 43 is formed between the substrate 42 and the post 41.

The method of manufacturing the pointing stick 40 comprises the following steps. Firstly, the substrate 42 is disposed on the post 41 in a manner that the protrusions 422 of the substrate 42 are abutted against the post 41 as shown in FIG. 3a. Then, a predetermined amount of adhesives 1 is supplied through the hollow portion 421 until part of the adhesives 1 is supplied into part of the gap 43. Afterward, the adhesives 1 are heated. The gap 43 is filled with the heated adhesives 1 by means of capillarity. As a result, the substrate 42 and the post 41 are combined together.

By the manufacturing method of this embodiment, the adhesive does not interfere with the operation of the strain gages. Furthermore, the sensitivity of the pointing stick is enhanced.

Furthermore, the substrate 42 may be not provided with the hollow portion 421 if the adhesive 1 can be supplied into the periphery of the gap 43 directly.

Second Embodiment

Figure 4:
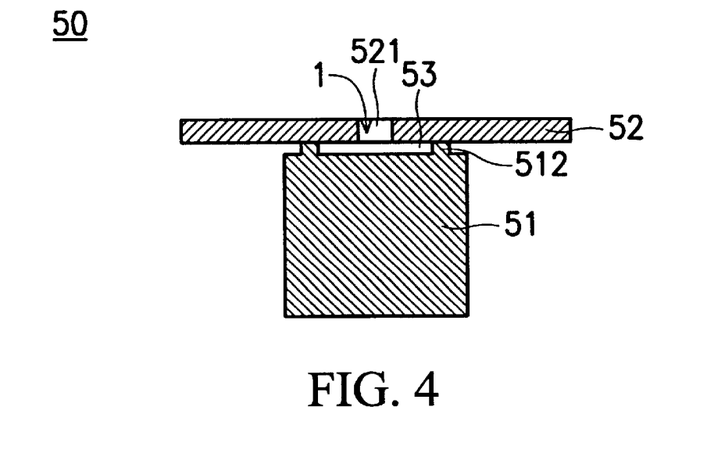
FIG. 4 is a schematic view depicting a method of manufacturing a pointing stick of a second embodiment of the present invention.

The structure of a pointing stick of a second embodiment of the present invention is shown in FIG. 4. The difference between the first embodiment and the second embodiment is that in the second embodiment the protrusions 512 are formed on a post 51. Other elements of the second embodiment correspond to the elements of the first embodiment; therefore, their descriptions are omitted.

The method of manufacturing the pointing stick 50 comprises the following steps. Firstly, the substrate 52 is disposed on the post 51 in a manner that the protrusions 512 of the post 51 are abutted against the substrate 52 as shown in FIG. 4. Then, a predetermined amount of adhesive 1 is supplied through the hollow portion 521 until part of the adhesive 1 is supplied into part of the gap 53. Afterward, the adhesive 1 is heated. The gap 53 is filled with the heated adhesive 1 by means of capillarity. As a result, the substrate 52 and the post 51 are combined together.

Third Embodiment

Figure 5A:
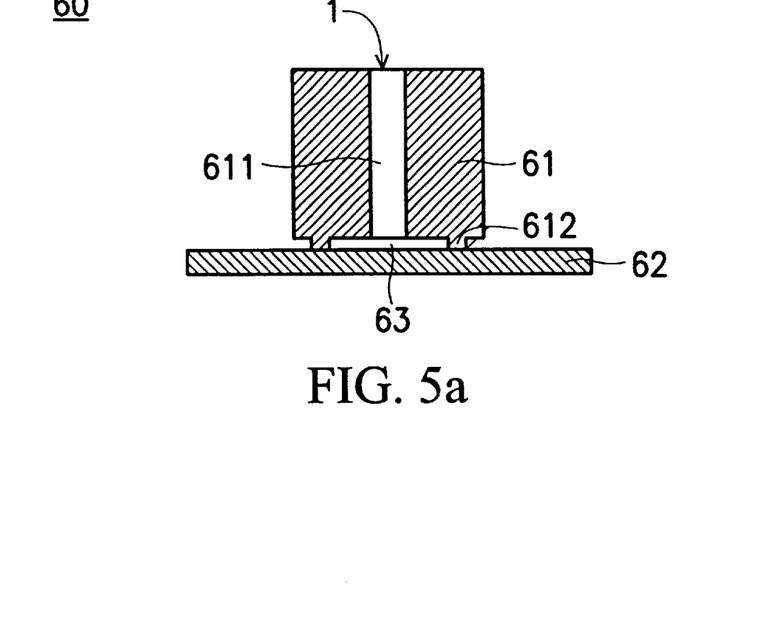
FIG. 5a is a schematic view depicting a method of manufacturing a pointing stick of a third embodiment of the present invention.
Figure 5B:
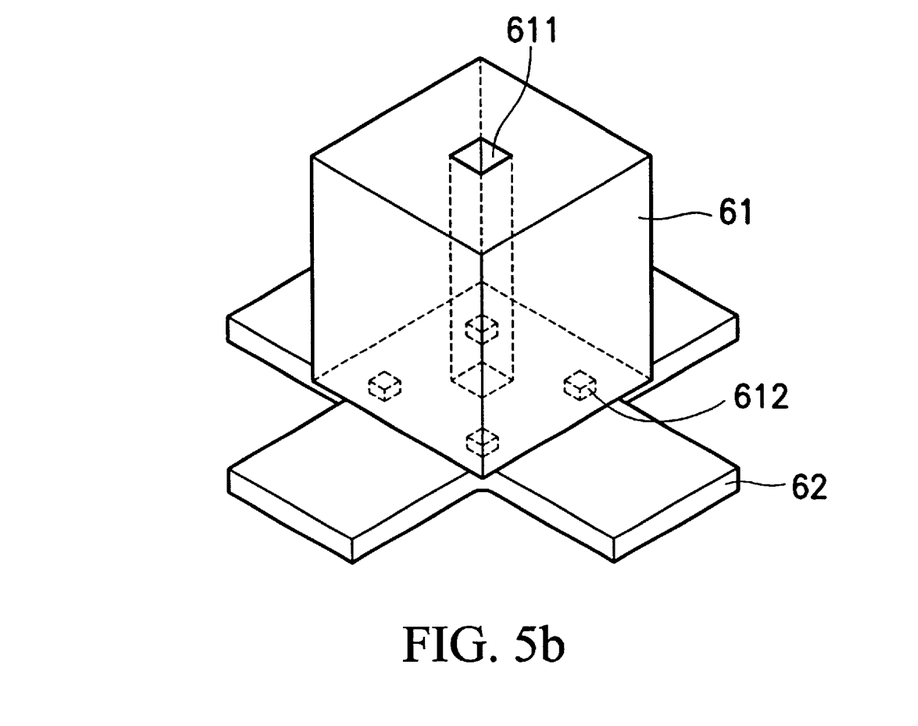
FIG. 5b shows a schematic view of a post according to the third embodiment of the present invention.

The structure of a pointing stick of a third embodiment of the present invention is shown in FIG. 5a and FIG. 5b. The difference between the first embodiment and the third embodiment is that a hollow portion 611 and protrusions 612 are formed on a post 61. Other elements of the third embodiment are corresponding to the elements of the first embodiment; therefore, their description is omitted.

The method of manufacturing the pointing stick 60 comprises the following steps. Firstly, the post 61 is disposed on the substrate 62 in a manner that the protrusions 612 of the post 61 are abutted against the substrate 62 as shown in FIG. 5a. Then, a predetermined amount of adhesive 1 is supplied through the hollow portion 611 until part of the adhesive 1 is supplied into part of the gap 63. Afterward, the adhesive 1 is heated. The gap 63 is filled with the heated adhesive 1 by means of capillarity. As a result, the post 61 and the substrate 62 are combined together.

Fourth Embodiment

Figure 6:
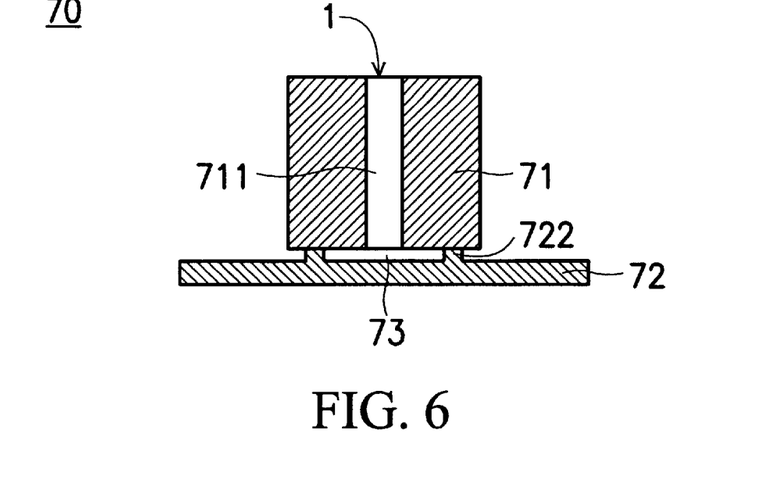
FIG. 6 is a schematic view depicting a method of manufacturing a pointing stick of a fourth embodiment of the present invention.

The structure of a pointing stick of a fourth embodiment of the present invention is shown in FIG. 6. The difference between the first embodiment and the fourth embodiment is that a hollow portion 711 is formed on a post 71. Other elements of the fourth embodiment correspond to the elements of the first embodiment; therefore, their descriptions are omitted.

The method of manufacturing the pointing stick 70 comprises the following steps. Firstly, the post 71 is disposed on the substrate 72 in a manner that the protrusions 722 of the substrate 72 are abutted against the post 71 as shown in FIG. 6. Then, a predetermined amount of adhesive 1 is supplied through the hollow portion 711 until part of the adhesive 1 is supplied into part of the gap 73. Afterward, the adhesive 1 is heated. The gap 73 is filled with the heated adhesive 1 by means of capillarity. As a result, the post 71 and the substrate 72 are combined together.

Fifth Embodiment

Figure 7:
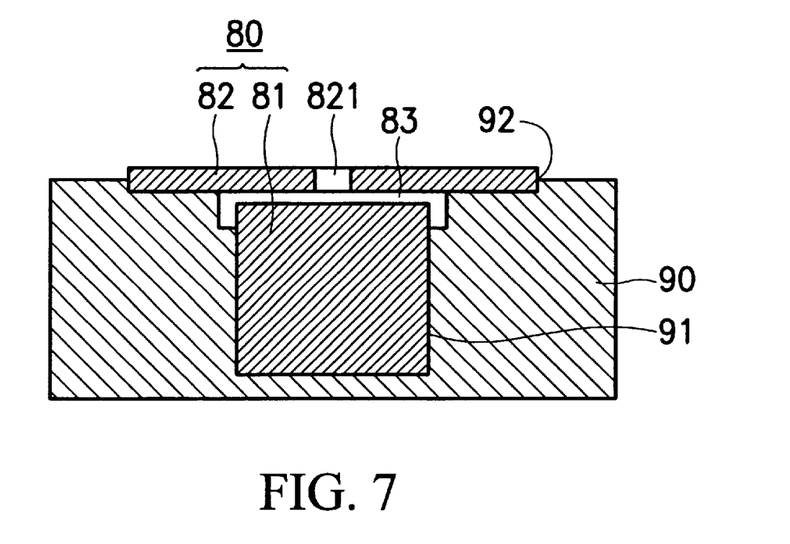
FIG. 7 is a schematic view depicting a method of manufacturing a pointing stick of a fifth embodiment of the present invention.

The structure of a pointing stick of a fifth embodiment of the present invention is shown in FIG. 7. The difference between the first embodiment and the fifth embodiment is that in the fifth embodiment, the protrusions are not formed on both a post 81 and a substrate 82; and a gap 83 formed between the post 81 and the substrate 82 is by means of a fixture 90 having a first concave portion 91 and a second concave portion 92. Other elements of the fifth embodiment correspond to the elements of the first embodiment; therefore, their descriptions are omitted.

The method of manufacturing the pointing stick 80 comprises the following steps. Firstly, the substrate 82 is disposed on the post 81 in a manner that the substrate 82 is disposed into the second concave portion 92 and the post 81 is disposed into the first concave portion 91 as shown in FIG. 7. Then, a predetermined amount of adhesive 1 is supplied through the hollow portion 821 until part of the adhesive 1 is supplied into part of the gap 83. Afterward, the adhesive 1 is heated. The gap 83 is filled with the heated adhesive 1 by means of capillarity. As a result, the substrate 82 and the post 81 are combined together.

Sixth Embodiment

In addition, the above manufacturing method can be used for enhancing the strength of the substrate by combining other auxiliary plates.

Figure 8:
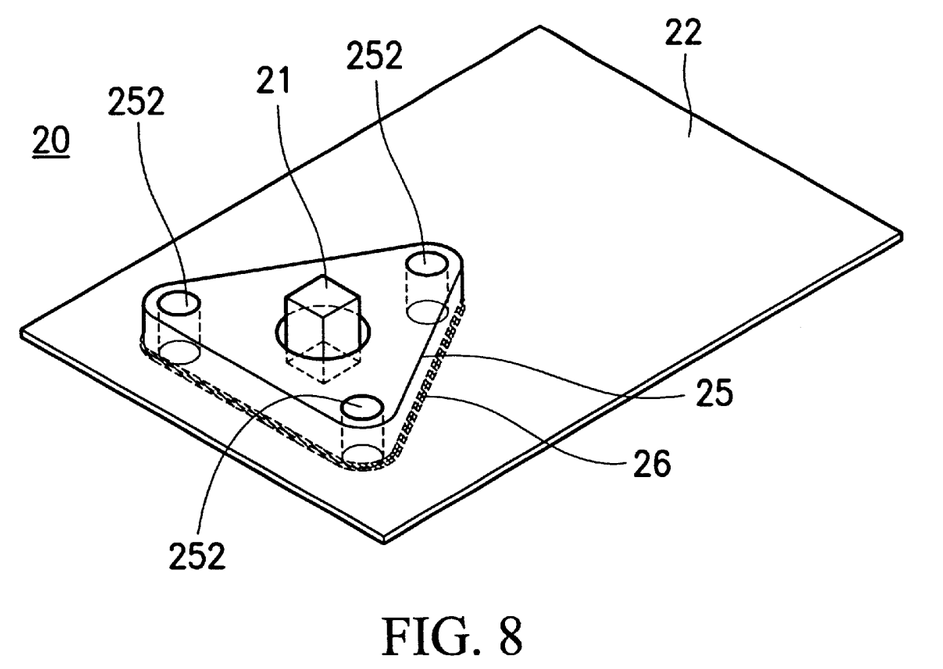
FIG. 8 is a perspective view showing a pointing stick of the present invention.
Figure 9A:
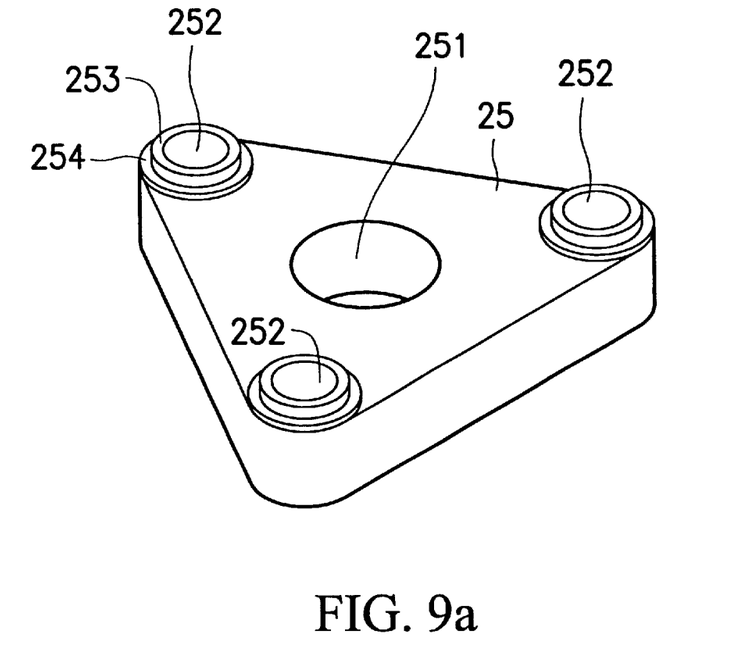
FIG. 9a is a perspective view of an auxiliary plate according to the present invention.
Figure 9B:
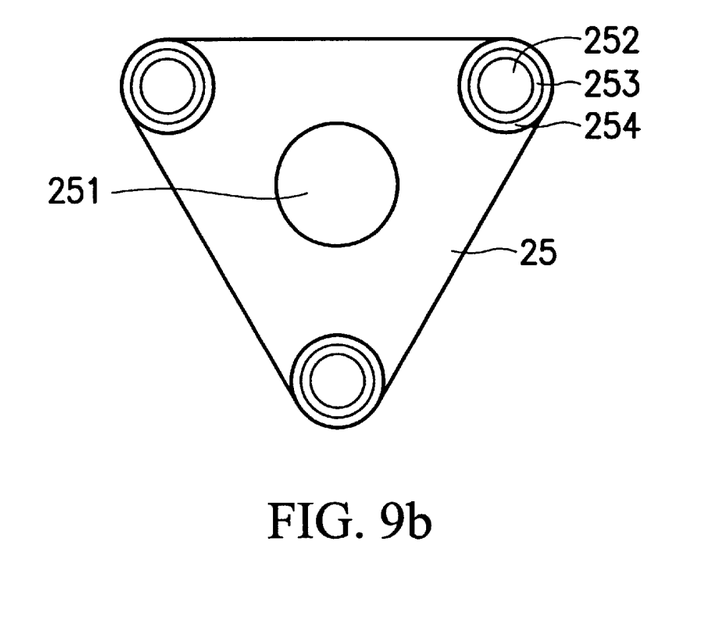
FIG. 9b is a top view of the auxiliary plate according to the present invention.
Figure 9C:
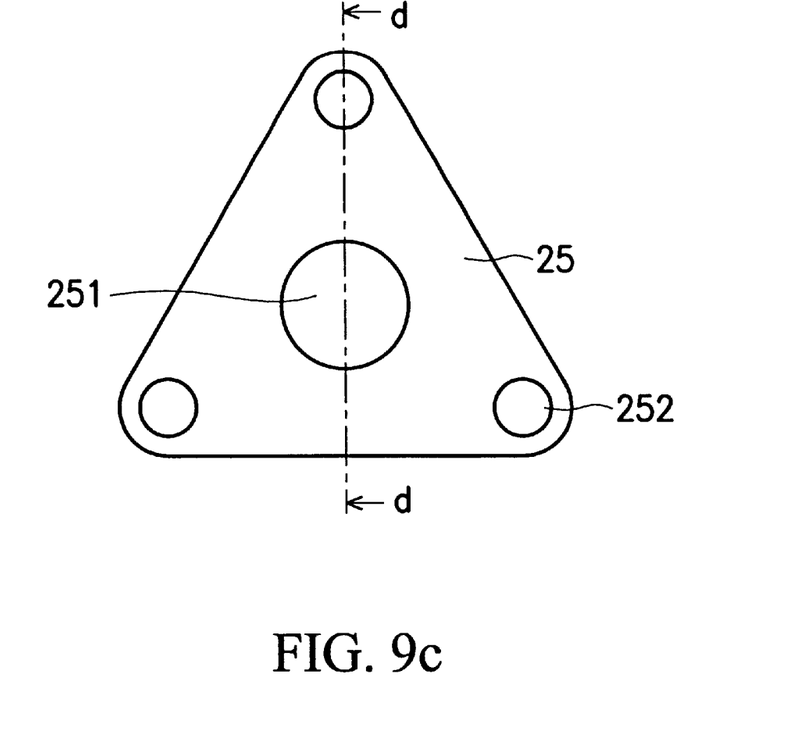
FIG. 9c is a bottom view of an auxiliary plate according to the present invention.
Figure 9D:
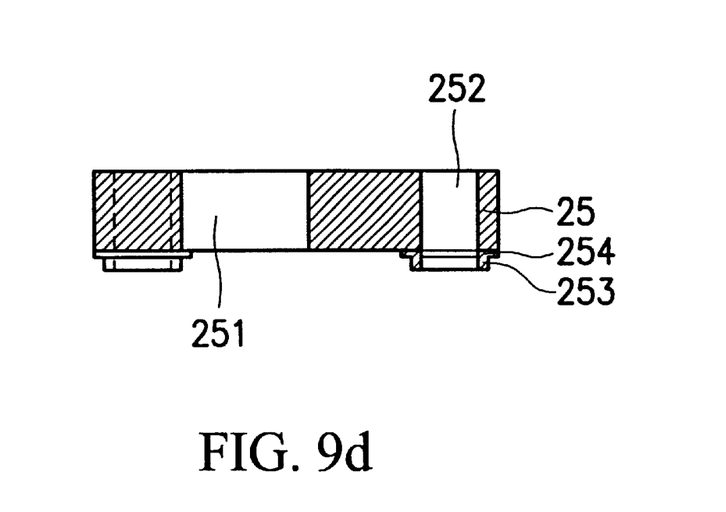
FIG. 9d is a cross sectional view along a line d—d in FIG. 9c.

A pointing stick 20 of a sixth embodiment is shown in FIG. 8. It consists of a post 21, a substrate 22 and an auxiliary plate 25. The auxiliary plate 25 and the substrate 22 are combined together by adhesive 26.

Referring to FIG. 9a, FIG. 9b, FIG. 9c and FIG. 9d, the auxiliary plate 25 may be a triangle. One center hole 251 and three through holes 252 are formed on the auxiliary plate 25. Periphery of each through hole 252 is provided with a flange 253. Periphery of each flange 253 is provided with a convex portion 254.

Figure 10:
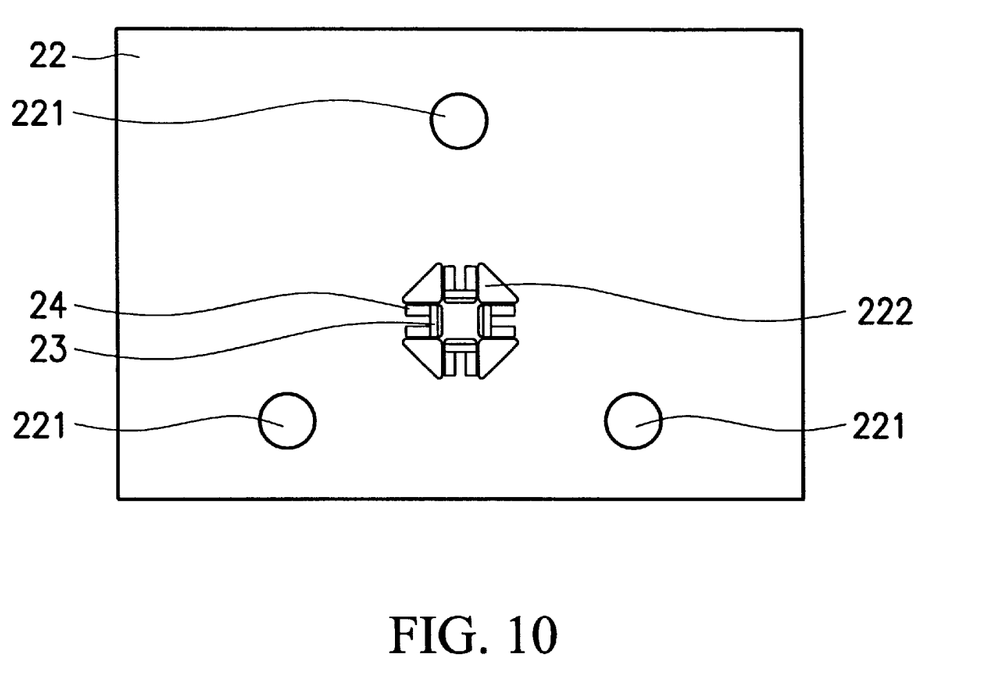
FIG. 10 is a top view of the pointing stick, without disposing the post and the auxiliary plate, according to the present invention.

Strain gages 23 and electrodes 24 are disposed on the substrate 22, as shown in FIG. 10. The substrate 22 is provided with three lead holes 221. Outer diameter of each flange 253 is substantially equal to inner diameter of each lead hole 221. Balancing holes 222 are formed between adjacent electrodes 24.

Figure 11A:
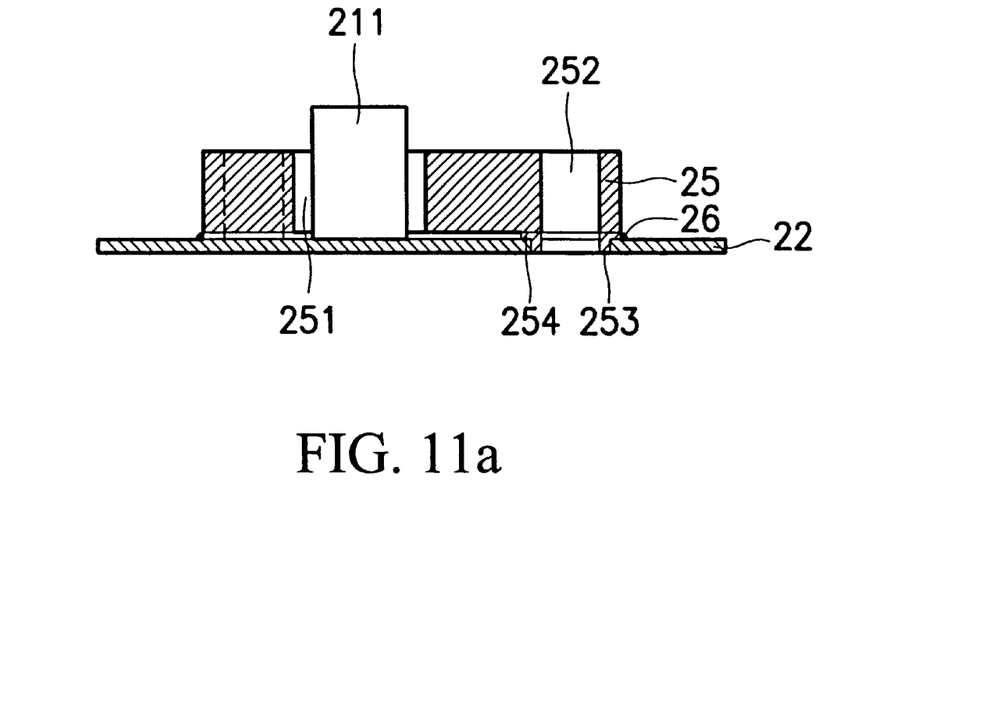
FIG. 11a and FIG. 11b are cross sectional views, showing the connecting manner between the substrate and the auxiliary plate, of the pointing stick of the present invention.
Figure 11B:
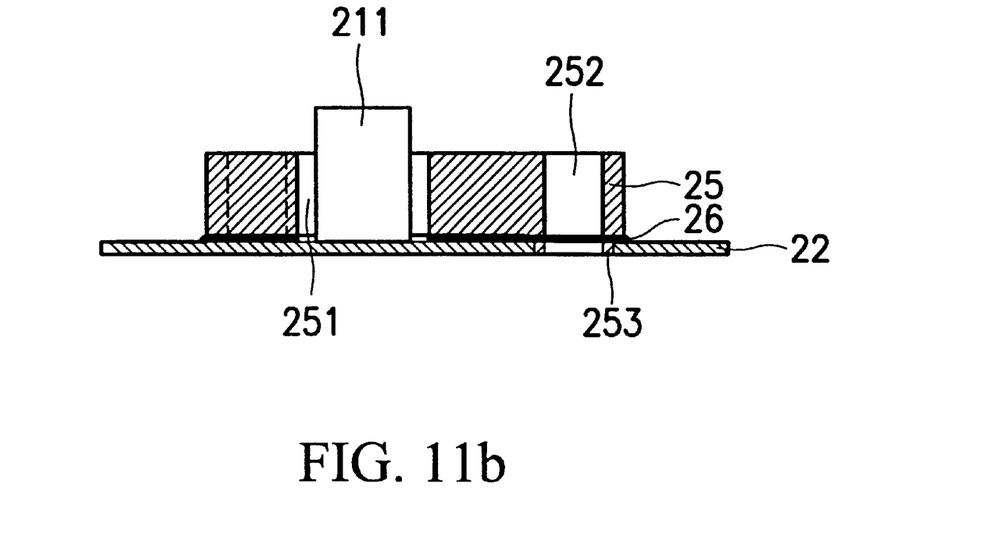

The combining manner between the auxiliary plate 25 and the substrate 22 is shown in FIG. 11a and FIG. 11b. Firstly, the auxiliary plate 25 is aligned with the substrate 22 by putting each flange 253 into each lead hole 221. Then, a predetermined amount of adhesive 26 with underfill function is supplied to the periphery of the auxiliary plate 25, as shown in FIG. 11a.

Afterward, the adhesive 26 is heated. A gap is formed between the auxiliary plate 25 and the substrate 22 by means of the convex portions 254. This gap is filled with the heated adhesive 26 by means of capillarity, as shown in FIG. 11b.

Figure 12:
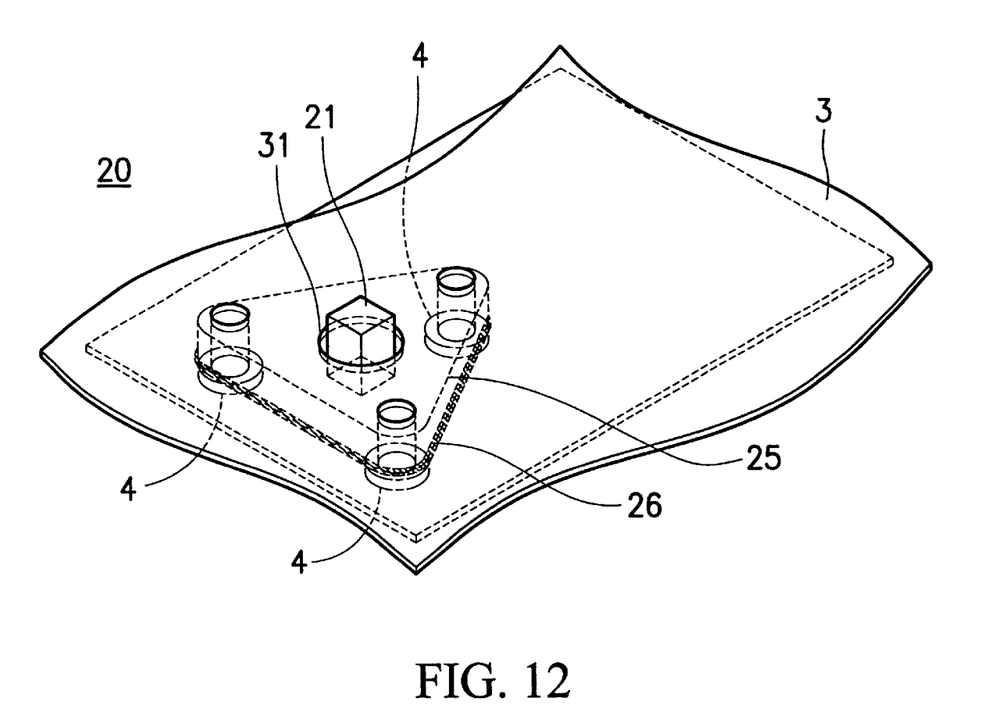
FIG. 12 is a schematic view of a pointing stick, disposed on a printed circuit board of an input device, according to the present invention.

The pointing stick 20 of the present embodiment is connected with a printed circuit board 3 of an input device by means of three screws 4, as shown in FIG. 12. The function of the auxiliary plate 25 is that it can prevent the strain gages from being subjected to undesired external force. Also, the auxiliary plate 25 is used for assisting in installation. The printed circuit board 3 is provided with a hole 31 for the post 21 to pass through. In addition, because the printed circuit board 3 is larger than the pointing stick 20, only part of the printed circuit board 3 is shown in FIG. 12.

Furthermore, the strain gages may be produced in a thick-film manner to reduce the cost.

Furthermore, the shape of the auxiliary plate and the balancing holes are not limited to triangular arrangements, but includes other shapes which can also attain such an effect.

By means of the above structure, the pointing stick of the present embodiment can prevent the strain gages from being subjected to external influence. Also, it can keep the position of the controlled object.

In addition, although the manufacturing method of this invention is mainly aimed at the pointing stick shown in FIG. 1, it can also be applied to the other type of the pointing stick, for example, a pointing stick having strain gages located on substrate but not overlapped with the post, or a pointing stick having strain gages located at the periphery of its post.

Furthermore, regarding the method of supplying the adhesive, except for supplying the adhesive through the hole on the substrate or the post as shown in the first embodiment to the fifth embodiment, the adhesive can be supplied to the interface between the substrate and the post as shown in the sixth embodiment.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A method of manufacturing a pointing stick comprising:

(a) providing a substrate;

(b) providing a post, and forming a hollow portion on the substrate or the post;

(c) disposing the post on a predetermined position of the substrate in a manner to form a gap between the substrate and the post;

(d) supplying a predetermined amount of adhesives into the gap through the hollow portion; and (e) heating the adhesives to combine the post and the substrate.

2. The method of manufacturing a pointing stick as claimed in claim 1, further comprising:

forming a plurality of protrusions on the substrate in step (a); and disposing the post on the substrate in a manner that the post is abutted against the protrusions in step (c).

3. The method of manufacturing a pointing stick as claimed in claim 1, further comprising:

forming a plurality of protrusions on the post in step (b);

disposing the post on the substrate in a manner that the substrate is abutted against the protrusions in step (c).

4. The method of manufacturing a pointing stick as claimed in claim 1, further comprising:

providing a fixture prior to step (a), wherein the fixture is provided with a first concave portion and a second concave portion; and disposing the substrate on the first concave portion and disposing the post on the second concave portion in step (c).

* * * * *